T. K. IRWIN.
APPARATUS FOR THE FILTRATION, AERATION, AND GASIFICATION OF LIQUIDS.
APPLICATION FILED SEPT. 8, 1915.
1,189,114.
Patented June 27, 1916.
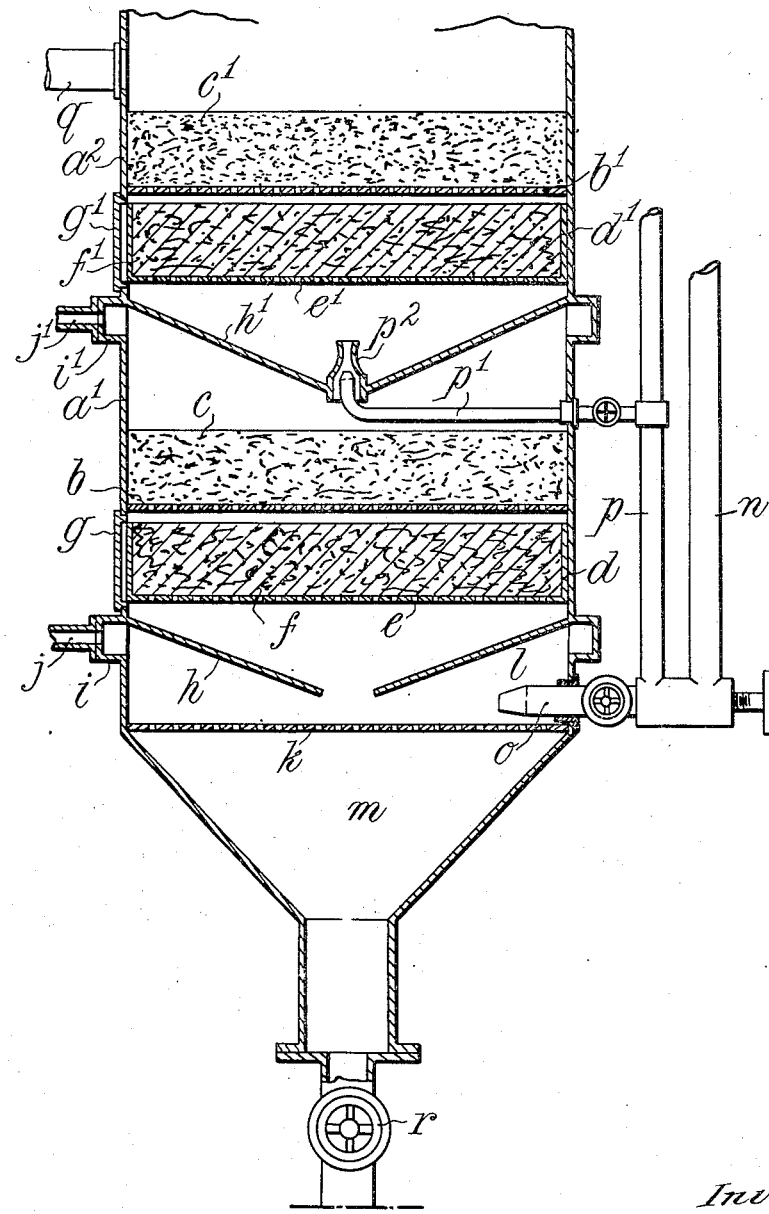
Inventor
T. K. Irwin,
by
Attorney.

UNITED STATES PATENT OFFICE.

THOMAS KEMPLAY IRWIN, OF LONDON, ENGLAND.

APPARATUS FOR THE FILTRATION, AERATION, AND GASIFICATION OF LIQUIDS.

1,189,114.  Specification of Letters Patent.  Patented June 27, 1916.

Application filed September 8, 1915. Serial No. 49,563.

*To all whom it may concern:*

Be it known that I, THOMAS KEMPLAY IRWIN, a subject of His Majesty the King of England, residing at London, in the county of London, Kingdom of England, have invented certain new and useful Improved Apparatus for the Filtration, Aeration, and Gasification of Liquids, of which the following is a specification.

This invention relates to apparatus for the filtration, aeration, or gasification and purification of liquids and it refers more especially to apparatus of the kind in which the filtering medium is divided into a plurality of sections or stages and in which the liquid to be filtered is first introduced into a chamber with a supply of air or gas under pressure and an auxiliary supply of air or gas is introduced at the subsequent stages.

Now according to the present invention I provide an improved multi-stage apparatus of this kind in which each section or stage comprises a fine bed adapted to serve as a filter, a second or coarse bed adapted to serve as a surface contact bed, and a lower chamber into which the liquid and the air or gas under pressure are introduced through a mixing device at each of the successive stages.

The invention is illustrated in, and hereinafter described with reference to the accompanying drawing which illustrates such apparatus in sectional elevation.

As shown and in one very convenient way of carrying out the present invention I provide a cylindrical vessel or receiver which may be of metal or concrete or the like and built up in sections or stages, two, $a'$ $a^2$ being shown in the present instance. Each section is provided with a perforated partition or false bottom $b$ $b'$ on which a layer of clinker, coke or other surface contact filtering medium $c$ $c'$ of suitable thickness is placed. Beneath each of said perforated partitions $b$ $b'$ I provide a chamber, which may contain a removable tray $d$ $d'$, which also has a perforated bottom $e$ $e'$ upon which a layer of sand or other relatively fine filtering medium $f$ $f'$ is placed. If trays are adopted the medium may be withdrawn bodily from the casing by means of removable doors $g$ $g'$ provided on the casing as shown or alternatively inspection doors may be provided for the removal of the medium from the chambers.

Below the perforated bottoms $e$ $e'$ and in the space to which the liquid and air or gas is introduced I preferably provide an oil or grease trap in the form of a downwardly directed cone $h$ $h'$ surrounded by an annular channel $i$ $i'$. The oil or grease entering with the liquid rises up the underside of these conical surfaces into the annular channels from which it can be continuously or periodically drawn off by way of outlet connections $j$ $j'$.

At the lower end of the receptacle $a'$ and beneath the lowermost perforated bottom $e$, I provide a perforated partition $k$ which forms a space or chamber $l$ into which the mixture of liquid and air or gas enters. This partition $k$ is disposed above a hopper or receiver $m$ which when the apparatus is in use is normally full of liquid and serves for the sedimentation of solid matter and for cleaning out purposes as will be hereinafter explained. This partition has the effect of eliminating the disturbing effect of the incoming liquid and thus facilitates the settlement of suspended matter from the undisturbed body of liquid in the hopper $m$.

The upper end of the vessel $a'$ is preferably closed but it may be left open in the case of a receptacle of sufficient height to enable air or gas under pressure to be used and the sewage or other liquid to be treated is introduced from a conduit $n$ through an inlet $o$ leading into the chamber $l$. The air or other gas is introduced into the receptacle $a'$ by way of the conduit $p$ and the inlets $o$, $p'$, $p^2$ leading in any well known or convenient manner from a pump or other compressor or from a storage chamber, in such a manner that the said air or gas and liquid will be mixed together by a mixing jet or the like which may conveniently be placed in the inlet connection $o$ and on the cone $h'$, at $p^2$, as hereinafter described. After passing through the various stages of the device the liquid passes out by way of the outlet tube $q$. The air or gas may be discharged by the same outlet or means may be adopted for drawing it off for further use.

The periodic cleaning of the filtering medium c and f when it becomes clogged or impervious to the liquid is preferably done in the known manner by passing a flow of water or other liquid through the filter in a downward or reverse direction so clearing away the solid matter which clogs up the first part thereof. A sludge cock r is provided at the lower end of the conical receptacle m for the removal of the sludge or solid matter which collects therein and when this cock is opened the sludge is discharged and at the same time, the filtering medium is cleaned by the resulting reversal of the direction in flow. This may be effected by automatic mechanism operating at regular intervals.

The supply of air or gas is regulated as required according to the amount required by the liquid, the pressure employed in the case of sewage liquors, conveniently being from one to three atmospheres. For this purpose I provide each upper section of the filter with a separate branch pipe $p'$ which leads from the conduit $p$ and discharges at the mixing jet at $p^2$ in the opening in the cone $h'$. Thus additional air or gas is added at the various stages according to requirements. Precipitants, sterilizing agents, coagulants, and or other chemicals, may be added at one or more of the stages as may be desired, and provision for the reception and removal of sludge may also be made at each stage of the apparatus.

What I claim as new and desire to secure by Letters Patent of the United States is:—

1. In an apparatus for the filtration, aeration or gasification, and purification of liquids, the combination of a casing, a plurality of spaced removable filter beds in the casing, a filtering bed of coarser material spaced over each removable bed, an inverted cone-shaped partition below each removable bed, each inverted cone-shaped partition having an opening, the casing having an oil channel below each cone-shaped partition, and means for introducing liquid and air to the casing below the lowermost cone-shaped partition.

2. In an apparatus for the filtration, aeration or gasification, and purification of liquids, the combination of a casing, a plurality of spaced removable filter beds in the casing, a filtering bed of coarser material spaced over each removable bed, an inverted cone-shaped partition below each removable bed, each inverted cone-shaped partition having an opening, means for introducing liquid and air to the casing below the lowermost cone-shaped partition, and means for introducing air at will to the center of the casing between the filtering beds.

3. In an apparatus for the filtration, aeration or gasification, and purification of liquids, the combination of a casing, a plurality of spaced removable filter beds in the casing, a filtering bed of coarser material spaced over each removable bed, an inverted cone-shaped partition below each removable bed, each inverted cone-shaped partition having an opening, an inlet pipe for introducing liquid to the casing below the lowermost cone-shaped partition, a pipe for supplying air to the liquid pipe, and a branch pipe extending from the air pipe and terminating in the opening in the cone-shaped partition between the filter beds.

4. In an apparatus for the filtration, aeration or gasification, and purification of liquids, the combination of a casing, a plurality of spaced removable filter beds in the casing, a filtering bed of coarser material spaced over each removable bed, a partition interposed between the filter beds, said partition having a central opening, a partition below the lowermost filter bed, the latter partition having a central opening, the casing having oil receiving channels below the partitions, pipes for drawing oil from the channels, a perforated partition in the bottom of the casing, the casing having inclined walls below the perforated partition to provide a hopper, a liquid inlet pipe entering the casing above the perforated partition, an air inlet pipe communicating with the liquid inlet pipe, and a branch pipe leading from the air inlet pipe to introduce a supply of air between the filter beds.

5. In an apparatus for the filtration, aeration or gasification, and purification of liquids, the combination of a casing, a plurality of spaced removable filter beds in the casing, a filtering bed of coarser material spaced over each removable bed, an inverted cone-shaped partition between the filter beds, said partition having a central sprayer, a gas supply pipe for introducing gas to the sprayer, an inverted cone-shaped partition below the lowermost filter bed, said latter partition having a central opening, a screen and a hopper below the lowermost cone-shaped partition, and a pipe for introducing gas and liquid to the casing between the lowermost cone-shaped partition and the screen.

6. In an apparatus for the filtration, aeration or gasification, and purification of liquids, the combination of a casing, a plurality of spaced filter beds in the casing, a filtering bed of coarser material spaced over each fine filter bed, a partition forming a chamber below each pair of fine and coarse filter beds, each partition having an opening therein, and means for introducing air and liquid through the said opening to the chamber.

7. In an apparatus for the filtration, aeration or gasification, and purification of liquids, the combination of a casing, a plurality of spaced filter beds in the casing, a filtering bed of coarser material spaced over each of the first mentioned beds, an inverted cone-shaped partition below each of the first mentioned beds, each inverted cone-shaped partition having an opening, means for introducing liquid and air to the casing below the lowermost cone-shaped partition, and means for introducing air at will to the center of the casing between the filtering beds, the liquid and air passing upwardly through the filtering beds.

In testimony whereof I have hereunto signed my name to this specification.

THOMAS KEMPLAY IRWIN.